Patented May 10, 1938

2,116,872

UNITED STATES PATENT OFFICE 2,116,872

MEDICINAL PREPARATION OF DIURETIC EFFECT AND PROCESS FOR ITS PREPARATION

Emil Wolf, Budapest, Hungary, assignor to the firm Chinoin Gyogyszer-Es Vegyeszeti Termekek Gyara R. T. (Dr. Kereszty and Dr. Wolf), Ujpest, Hungary No Drawing. Application October 3, 1935, Serial No. 43,385. In Hungary March 12, 1935

4 Claims. (Cl. 167—71)

It is a well known fact that organic mercury compounds which contain mercury bound to a carbon atom of an aliphatic lateral chain and carboxyl group, possess a diuretic effect. It is, however, only when employed in the form of injections that such preparations exercise this effect, whereas when administered per os they are ineffective.

Rectal employment has been prevented by the fact that these preparations are scarcely soluble in water and are therefore absorbed in an imperfect manner only, while their salts, as e. g. their sodium salts are strongly alkaline and irritate the mucous membrane of the rectum.

I have found that the drawback referred to above can be eliminated if compounds possessing a diuretic effect and containing a free carboxyl group and mercury bound to a carbon atom of an aliphatic lateral chain are mixed, in the presence of a solvent, with a quantity of alkali insufficient for the neutralization of the carboxyl, and the salt thus produced is separated together with the unneutralized part of the initial compound. It is surprising that preparations obtained in this manner are soluble in water in spite of the fact that they also contain free acid which is insoluble in water. The aqueous solutions remain clear for a more or less considerable length of time. Sometimes solutions prepared in this manner become turbid in 30 to 60 minutes owing to precipitation of very finely divided particles of the acid not converted into the salt. These particles are so finely dispersed that they will be absorbed very quickly through the mucous membrane. Owing to the only partial salt formation the product shows a lesser degree of alkalinity than a product obtained by converting the carboxylic group completely into the corresponding salt. When preparing the new compositions, it is preferable to use such quantities of alkali as are necessary to neutralize only 70 to 85% of the carboxyl group of the acid, so that the compositions obtained will contain 15–30% of the original acid and 85–70% of a salt of the same acid.

Examples 1. 487 grams (1 mol.) of the mercury compound produced by one of the known mercurating methods from the alpha-allylamide of the acid camphoric and having the probable formula:

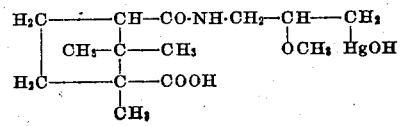

in which formula the relative positions of the groups OCH₃ and HgOH in the lateral chain may be interchanged, are dissolved in a solution of sodium ethylate which is prepared by dissolving 17.2 grams (¾ of 1 mol.) of metallic sodium in 780 grams of absolute alcohol. If necessary, the solution may be cleared by centrifuging or by some other means. The clear viscous sirupy solution is stirred into 5 litres of dry ether. A snowy white precipitate is obtained which, after allowing to settle down for some time, is filtered off and washed with dry ether. The dried product is stable. Its weight amounts to 480 grams.

This product gives with 2 to 4 weights of water a sirupy solution from which, only after a considerable length of time, part of the starting material not converted into the sodium salt will precipitate in a finely divided condition. The pH value of solutions prepared from 1 part by weight of the substance and 15 parts of water is about pH:8.

2. 501 grams (1 mol.) of the mercury compound corresponding to the formula as given in Example 1, but containing an OC₂H₅ group instead of an OCH₃ group, are partially converted into salt in the manner described in Example 1, using sodium ethylate prepared from 19.5 grams (¾ mol.) of sodium.

3. 487 grams (1 mol.) of the mercury compound produced by one of the known mercurating methods from the beta-allylamide of camphoric acid and having the probable formula:

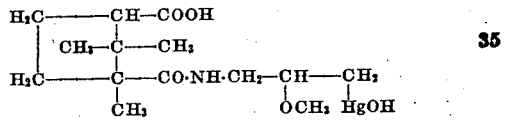

in which formula the relative positions of the groups OCH₃ and HgOH in the lateral chain may be interchanged, are dissolved in a solution of sodium ethylate prepared by dissolving 16.1 grams (0.7 mol.) of metallic sodium in 780 grams of absolute alcohol. In the manner described in Example 1, 470 grams of a snowy white product are obtained.

1 part of this product is easily soluble in 2 to 4 parts of water.

The products described above are suitable for rectal application especially in the form of suppositories, in which case the product is embedded into a suitable carrier material as, for instance, cocoa butter.

What I claim is:—

1. A composition comprising an allyl-amide of camphoric acid containing the mercury bound to a carbon atom of an aliphatic lateral chain and a free carboxyl group, in an amount less than one third the weight of the composition, and an alkali metal salt of the same organic mercury compound in an amount which is more than two thirds the weight of the composition.

2. A composition comprising a mono-allyl-amide of camphoric acid, containing mercury bound to a carbon atom of the allyl group and an alkoxy group bound to another carbon atom of the allyl group, in an amount varying from 15 to 30% of the weight of the composition, and a sodium salt of the same mercurated amide in an amount which varies from 85 to 70% of the weight of the composition.

3. A suppository containing a composition comprising a mono-allyl-amide of camphoric acid, containing mercury bound to a carbon atom of the allyl group and an alkoxy group bound to another carbon atom of the allyl group, in an amount which varies from 15 to 30% of the weight of the composition, and a sodium salt of the same mercurated amide in an amount which varies from 75% to 80% of the amount of the composition.

4. A suppository comprising a composition consisting of a mono-allyl-amide of camphoric acid containing mercury bound to a carbon atom of the allyl group and an alkoxy group bound to another carbon atom of the allyl group, in an amount which varies from 15% to 30% of the composition, and a sodium salt of the same mercurated amide in an amount which varies from 85% to 70% of the weight of the composition.

EMIL WOLF.